(No Model.) 5 Sheets—Sheet 3.
G. P. WOOD.
Cloth Tentering Machine.
No. 237,225. Patented Feb. 1, 1881.

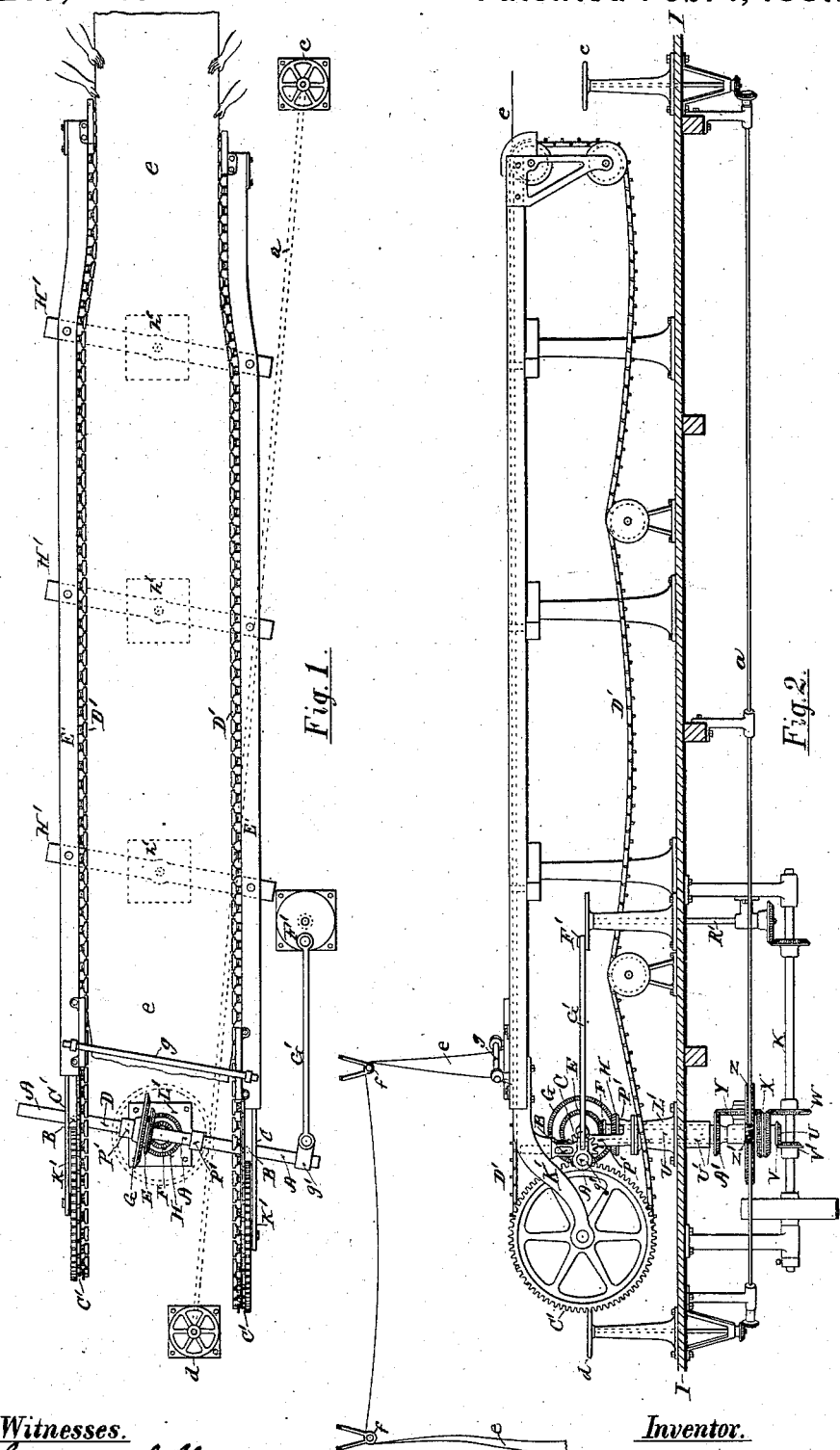

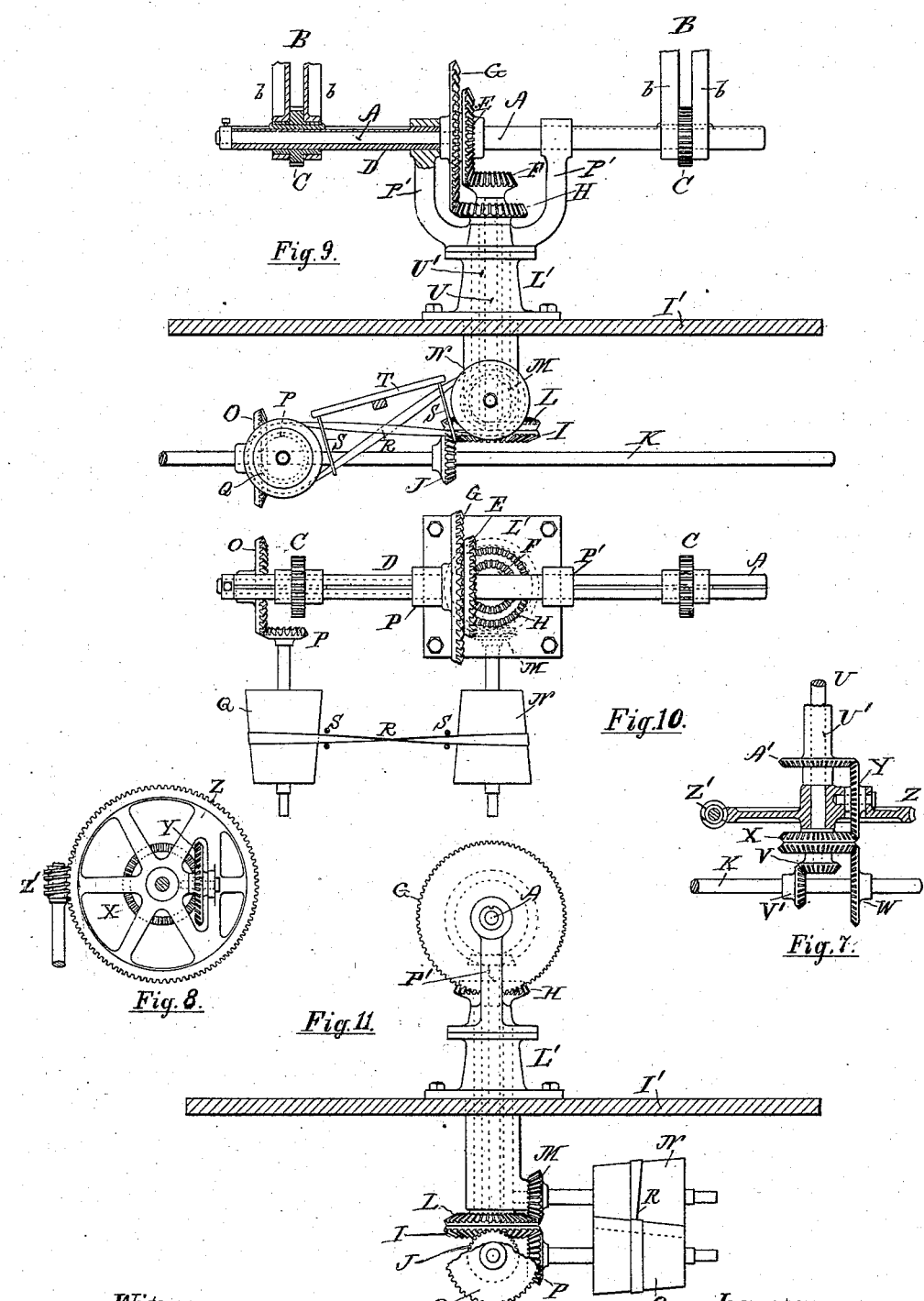

Witnesses.
Edward Card
Joseph J. Scholfield.

Inventor.
George P. Wood
per J. Scholfield
attorney (No Model.) 5 Sheets—Sheet 4.
G. P. WOOD.
Cloth Tentering Machine.
No. 237,225. Patented Feb. 1, 1881.
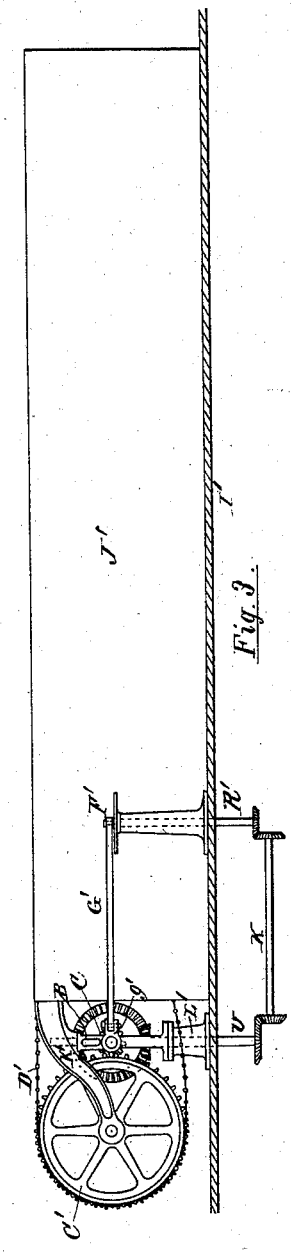
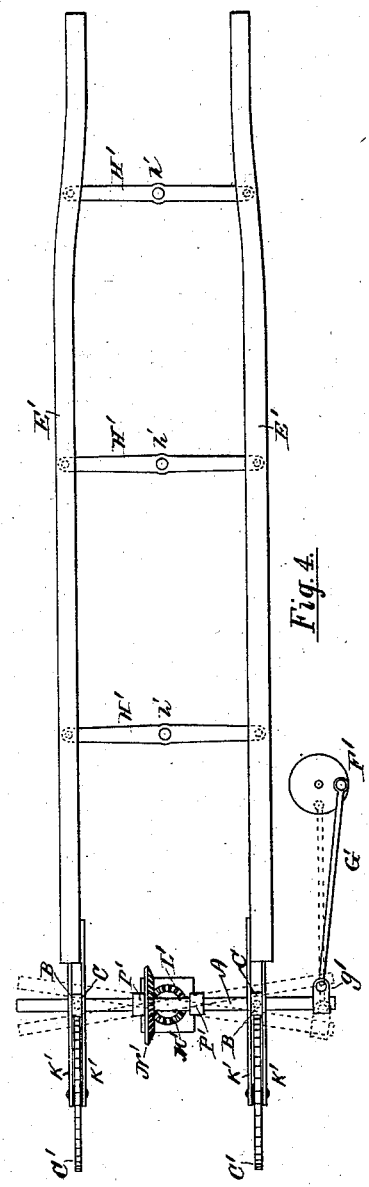
Witnesses.
H. W. Hubbard.
S. Scholfield.
Inventor.
George P. Wood (No Model.)　　　　　　　　　　　　　　　　　5 Sheets—Sheet 5.
G. P. WOOD.
Cloth Tentering Machine.

No. 237,225.　　　　　　　　　Patented Feb. 1, 1881.

Witnesses.　　　　　　　　　　　Inventor.
Edward Card　　　　　　　　　George P Wood
Joseph J. Scholfield　　　　　　per J. Scholfield
　　　　　　　　　　　　　　　　　Attorney

UNITED STATES PATENT OFFICE.

GEORGE P. WOOD, OF OLNEYVILLE, ASSIGNOR TO HIMSELF AND EDWARD RICE, OF PROVIDENCE, RHODE ISLAND.

CLOTH-TENTERING MACHINE.

SPECIFICATION forming part of Letters Patent No. 237,225, dated February 1, 1881.

Application filed April 22, 1880. (No model.)

*To all whom it may concern:*

Be it known that I, GEORGE P. WOOD, of Olneyville, in the county of Providence, in the State of Rhode Island, have invented an Improvement in Cloth-Tentering Machines, of which the following is a specification.

The nature of my invention consists in an improvement upon what is known as "The Swiss Tenter-Machine;" and it consists in operating the two clip-chains which hold the edges of the cloth by means of adjustable gearing, in order to make proper allowance for the unequal length or tension of the two edges of the web, and thus preserve the proper rectangular crossing of the threads.

Figure 6:
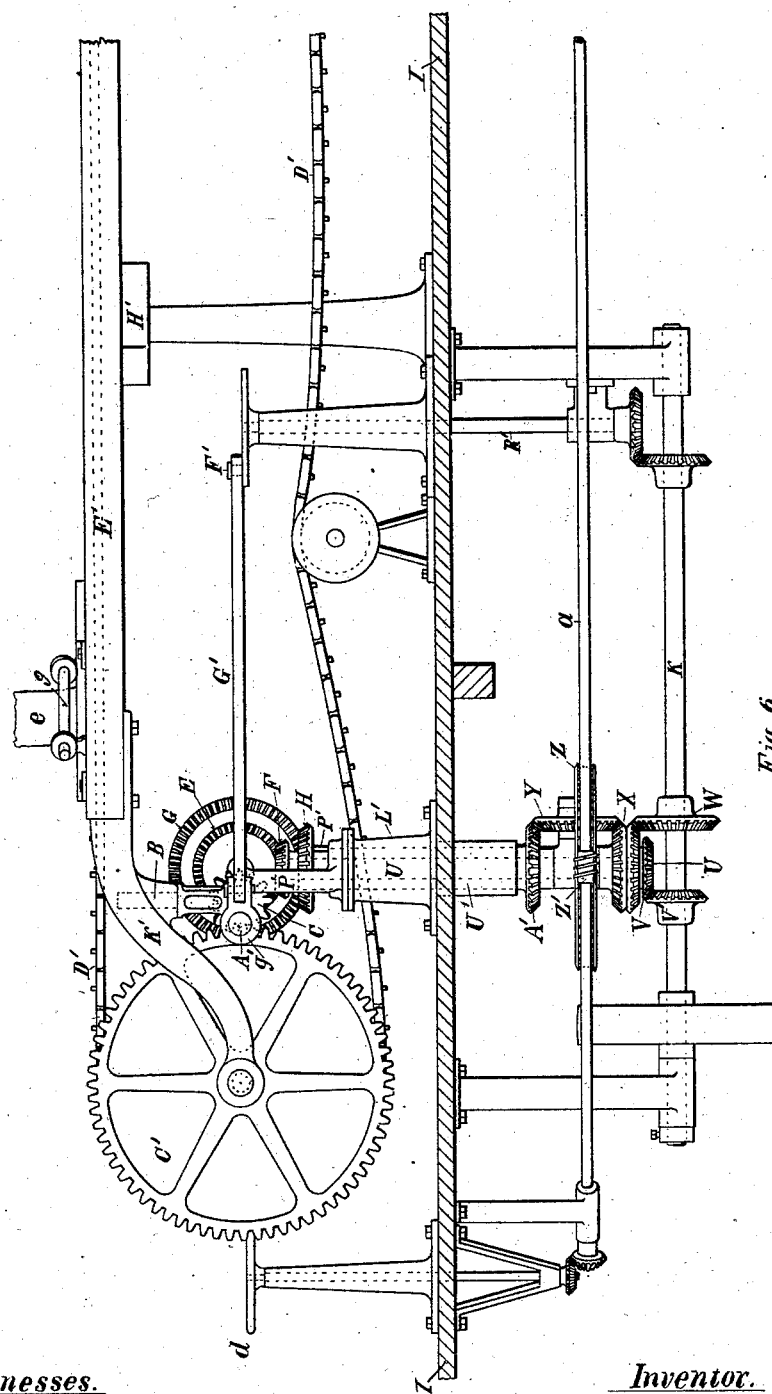
Figure 5:
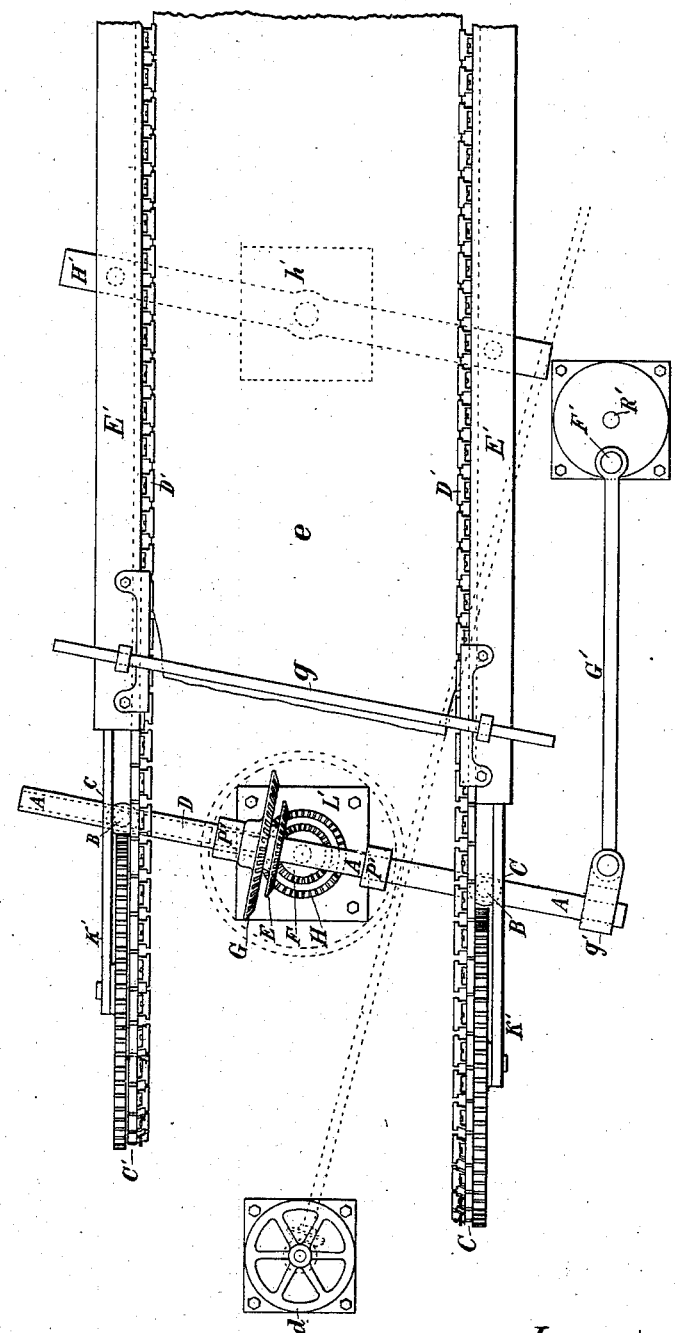

Figure 1 represents a plan view of the machine provided with my improvement. Fig. 2 represents a side elevation of the same. Fig. 3 represents a side elevation of the working parts of the machine as constructed without my improvement. Fig. 4 represents a plan view of the same. Fig. 5 represents an enlarged plan view of the driving end of the machine as provided with my improvement, operated by means of compound gears. Fig. 6 represents a side elevation of the same. Figs. 7 and 8 represent the details of the compound gearing employed to change the relative movements of the clip-chains. Fig. 9 represents a front elevation of the operating mechanism, illustrating the method of changing the relative movements of the clip-chains by means of cone-pulleys. Fig. 10 is a plan view of the same. Fig. 11 is a side elevation with a portion of one of the driving-gears broken away.

In the accompanying drawings, in Figs. 3 and 4, which represent the tenter-machine as ordinarily constructed, C' C' are the rag-wheels which carry the clip-chains D' D', one of which is represented in Fig. 3. The sides E' E' of the machine are made to vibrate longitudinally by means of the crank F' and connecting-rod G', jointed to the loose-fitting strap g', placed at the end of the pivoted vibrating shaft A, which is attached to the frame by means of the pivoted hangers B B. The sides E' E' are connected by means of the bars H' H' H', pivoted at the points h' h' h' in line with the pivot of the shaft A. The vibration of the shaft A is indicated by the dotted lines in Fig. 4.

I' represents the floor of the room, and J' a piece of cloth or canvas covering the sides of the machine, in order to properly retain the heat of the steam-pipes and direct the same against the web. The rag-wheels C' C' are held between the double hangers K' K', attached to each of the sides E'. The vibrating shaft A is pivoted to a stand, L', secured to the floor I', the shaft A being driven from the upright shaft U by means of the bevel-gears M' and N', and the upright shafts U and R' are connectedly driven from the main shaft K by means of suitable bevel-gears. The pinions C C, which drive the rag-wheels C' C' and clip-chains, are held upon the shaft A by means of a spline, which will not allow the pinions to be turned on the shaft. The relative positions of their teeth cannot therefore be changed while the machine is in motion. For this reason no provision can be made for the adjustment of the relative movements of the chains on account of the unequal lengths of the selvages of the web when held in the clips of the chains. It is therefore necessary for the operatives engaged in feeding to watch the inequality at the delivering end of the machine, which is at a great distance from the feeding end, and by pulling on the edge of the web, as the circumstances may require, gradually bring the threads to their proper position, as near as may be.

With the most careful attention, however, the work is liable to great and long-continued variation.

The object of my improvement is to furnish means for rapid adjustment while the machine is in operation, so that upon the appearance of any discrepancy at the delivering end the operative may at once make the required adjustment without having to wait for that portion of the web held by the clips of the chain to pass entirely through the machine, which will require a comparatively long time.

The application of my improvement is shown in Figs. 1 and 2, where A is the pivoted vibrating shaft, held in the hangers B B, pivoted to the frame of the machine, and in the pivot-arms P P', as shown also in Figs. 5 and 6. One of the pinions C is secured by means of a feather and retaining-groove upon the shaft A, and the other, by the same means, upon the sleeve D, surrounding said shaft, and both are held in place between the jaws b b of the pivoted hangers B B, all as shown in Figs. 9 and 10. The shaft A is driven by means of the bevel-gears E and F, and the sleeve D is driven in the same direction by means of the gears G and H. The upright shaft U, upon the upper end of which the gear F is placed, is driven, in the construction shown in Figs. 1, 2, 5, 6, 7, and 8, by means of the bevel-gear V upon the lower end of the shaft, and the gear V′ upon the main driving-shaft K, located below the floor I. The sleeve U′, which surrounds shaft U, and upon the upper end of which the gear H is placed, is driven by means of the gear W upon the driving-shaft K, the double-faced bevel-gear X, turning loosely upon the upright shaft U, gear Y, pivoted to the worm-gear Z, and the gear A′ upon the lower end of the sleeve.

When the machine is in motion, by moving the worm-gear Z by means of the worm Z′, the relative angular position of the teeth of the pinions C C upon the vibrating shaft A will be changed, and by this means the relative movements of the clip-chains may be readily adjusted to suit the unequal lengths of the edges of the web.

The worm-gear Z′ is placed on a shaft, a, connecting by bevel-gears with the shaft of hand-wheel c near the feeding end of the machine, and under the immediate control of the feeding-operator, and with the shaft of the hand-wheel d located near the delivering end of the machine, in order that the necessary adjustment may be readily made from either end, as desired.

The web e passes from the machine over the rolls f f, (shown in Fig. 2,) and in its vertical passage from the roll g the distortion of the web will be readily detected by the operator, and a slight turn on either of the hand-wheels c or d will serve to immediately remedy the defect by causing one of the chains to move either faster or slower than the other until the proper relative position is reached.

The clip-chains D′ D′ move back and forth with the vibration of the shaft A, and serve to continually move the threads of the web held in the clips while in the process of drying.

Instead of the compound gears above described for changing the relative position of the clip-chains while the machine is in motion, a pair of cone-pulleys may be employed to change the relative speeds of the clip-chains in their forward movements, as shown in Figs. 9, 10, and 11, where the upright shaft U, upon which the gear F is placed, is driven by means of the gear I upon the lower end of the shaft, and the gear J upon the main driving-shaft K. The gear H upon the sleeve U′, inclosing the shaft U, is driven in the same direction with the gear F by means of the gear L upon the lower end of the upright sleeve, and the gear M upon the shaft of the cone-pulley N, which is driven by means of the bevel-gear O upon the main driving-shaft, the gear P on the shaft of the cone-pulley Q, and the cross-belt R, running between the guides S S, attached to the bar T. The movement of the belt R, by means of the belt-guide, to either side of its central position on the pulleys, will cause the pinions C C to revolve at unequal rates of speed, thus causing one of the clip-chains to move faster or slower than the other, to correct any decided inclination of the threads of the web, and when the threads of the web have been brought to their proper position the belt may be shifted to its central position on the cone-pulleys, causing the pinions C C and the clip-chains to again move at a uniform rate of speed. The belt-guide is to be placed under the control of the person feeding the machine by means of suitable connections, as before described.

I claim as my invention—

1. In a cloth-tentering machine, the combination, with the clip-chains, their supporting-frames, and mechanism for reciprocating said frames, of driving mechanism and means for regulating the same, whereby the speeds of said chains may be varied with respect to each other, substantially as described.

2. In a cloth-tentering machine, the combination of a pinion, C, vibrating shaft A, upright shaft U, and the connecting-gears E and F, with a second pinion, C, sleeves D and U′, and the connecting-gears G and H, with means for driving the shaft U and sleeve U′ separately, and mechanism for regulating the said driving means, whereby the relative movements of the pinions C may be varied with respect to each other, substantially as described.

GEORGE P. WOOD.

Witnesses:
H. W. HUBBARD,
H. S. BABCOCK.